US008706021B2

(12) United States Patent
An et al.

(10) Patent No.: US 8,706,021 B2
(45) Date of Patent: Apr. 22, 2014

(54) METHOD FOR MEDIATING BETWEEN A ONE-TO-ONE QUESTION AND ANSWER IN COMMUNICATION NETWORK AND SYSTEM FOR EXECUTING THE METHOD

(75) Inventors: Mihyang An, Seoul (KR); SoYoun Park, Kyunggido (KR)

(73) Assignee: NHN Corporation, Seongnam-si (KR)

( * ) Notice: Subject to any disclaimer, the term of this patent is extended or adjusted under 35 U.S.C. 154(b) by 1932 days.

(21) Appl. No.: 11/674,192

(22) Filed: Feb. 13, 2007

(65) Prior Publication Data

US 2007/0190516 A1 Aug. 16, 2007

(30) Foreign Application Priority Data

Feb. 14, 2006 (KR) .................. 10-2006-0014006

(51) Int. Cl.
*G09B 7/00* (2006.01)
(52) U.S. Cl.
USPC ........... 434/350; 434/336; 434/322; 434/323; 709/204
(58) Field of Classification Search
USPC .................. 434/350, 322, 336, 323; 709/204
See application file for complete search history.

(56) References Cited

U.S. PATENT DOCUMENTS

| 5,991,595 | A | * | 11/1999 | Romano et al. ............... 434/353 |
| 6,028,601 | A | * | 2/2000 | Machiraju et al. ............ 715/705 |
| 6,081,788 | A | | 7/2000 | Appleman et al. |
| 6,195,681 | B1 | | 2/2001 | Appleman et al. |
| 6,336,132 | B2 | | 6/2002 | Appleman et al. |
| 7,853,602 | B2 | * | 12/2010 | Gorti et al. ..................... 707/753 |
| 2002/0133550 | A1 | * | 9/2002 | Mears et al. ................... 709/204 |
| 2003/0028525 | A1 | * | 2/2003 | Santos et al. ...................... 707/3 |
| 2005/0060283 | A1 | * | 3/2005 | Petras et al. ..................... 707/1 |
| 2006/0004601 | A1 | * | 1/2006 | Marks ............................. 705/1 |
| 2006/0084048 | A1 | * | 4/2006 | Sanford et al. ............... 434/323 |
| 2006/0173702 | A1 | * | 8/2006 | Saxena et al. .................... 705/1 |
| 2006/0286530 | A1 | * | 12/2006 | Forrest et al. ................ 434/323 |
| 2007/0174265 | A1 | * | 7/2007 | Gorti et al. ........................ 707/4 |

FOREIGN PATENT DOCUMENTS

| JP | 2002-324124 | 11/2002 |
| JP | 2003-044487 | 2/2003 |
| JP | 2004-102730 | 4/2004 |
| JP | 2004-295328 | 10/2004 |
| JP | 2005-266938 | 9/2005 |
| KR | 1020000054595 A | 5/2000 |
| KR | 1020050088888 A | 9/2005 |

* cited by examiner

*Primary Examiner* — Xuan Thai
*Assistant Examiner* — Banafsheh Hadizonooz
(74) *Attorney, Agent, or Firm* — Greer Burns & Crain, Ltd.

(57) ABSTRACT

A method and system of relaying a one-to-one question and answer which is performed in a network via a one-to-one question and answer relay system, the method including: assigning event occurrence information to request for transmission of question data to a service webpage; providing a question bridge page to a terminal of a first user where an event based on the event occurrence information occurred; receiving the question data from the terminal of the first user when a question registration request about a second user is received from the terminal of the first user via the question bridge page; storing the received question data in an answer request area of the second user; and storing answer data about the question data in an answer check area of the first user, the answer data being received from a terminal of the second user.

27 Claims, 16 Drawing Sheets

METHOD FOR MEDIATING BETWEEN A ONE-TO-ONE QUESTION AND ANSWER IN COMMUNICATION NETWORK AND SYSTEM FOR EXECUTING THE METHOD

CROSS-REFERENCE TO RELATED APPLICATION

This application claims the benefit of Korean Patent Application No. 10-2006-0014006, filed on Feb. 14, 2006, in the Korean Intellectual Property Office, the disclosure of which is incorporated herein by reference.

BACKGROUND OF THE INVENTION

1. Field of the Invention

The present invention relates to a method of relaying a one-to-one question and answer in a network and a system for performing the method.

2. Description of Related Art

In a question and answer relay method according to a conventional art, when a questioner selects a directory associated with a question, and posts a title and content of the question on a service webpage associated with the selected directory, a user who has relevant knowledge, among a plurality of users, provides an answer to the question as an answerer.

FIG. 1 illustrates a system for relaying a question and an answer between user terminals in a network according to a conventional art. As shown in FIG. 1, a user transmits/receives question data 121 and answer data 122 with a server of a service provider via a network 110 using a user terminal 100.

However, in the conventional question and answer relay method, the questioner may receive an answer only when a questioner's question is displayed to a user who has knowledge about the question. In this instance, the questioner may be unsure whether the user who gave the answer has professional knowledge about the question, and thus the questioner may be unsatisfied with the answer. Also, in the conventional question and answer relay method, an answerer is required to find a question to give an answer to, and also the answerer may not readily find an appropriate question.

BRIEF SUMMARY

The present invention provides a method of relaying a one-to-one question and answer in a network, and a system for performing the method.

An aspect of the present invention is to enable a first user to select a second user who generated an answer associated with a question of the first user while reading a service webpage associated with questions and answers, and to transmit the question to the second user, and thereby improve a probability that the first user may receive a desired answer to the question, and also to reduce a time and effort that the second user may expend to search for the question to give an answer to, and to improve a probability that the second user may receive a desired question.

Another aspect of the present invention is to provide a method of directly transmitting a question to a particular user, and thereby make a user who receives the question generate an answer of a high quality without a compulsion, and with a responsibility.

Another aspect of the present invention is to improve a probability that a service provider may transmit an answer about a question to a questioner via the above-described method, and to increase a number of answers and improve the quality of the question and answer. Accordingly, users may be more satisfied with questions and answers and thus a great number of users may utilize a service of the service provider.

According to an aspect of the present invention, there is provided a method of relaying a one-to-one question and answer which is performed in a network via a one-to-one question and answer relay system, the method including: assigning event occurrence information to request for transmission of question data to a service webpage; providing a question bridge page to a terminal of a first user where an event based on the event occurrence information occurred; receiving the question data from the terminal of the first user when a question registration request about a second user is received from the terminal of the first user via the question bridge page; storing the received question data in an answer request area of the second user; and storing answer data about the question data in an answer check area of the first user, the answer data being received from a terminal of the second user.

Also, the step of assigning may include assigning the event occurrence information to a user identifier when the user identifier is displayed on the service webpage, and assigning the event occurrence information to a user information page associated with the user identifier when the service web page corresponds to the user information page.

Also, the step of providing may include: transmitting the question bridge page to the terminal of the first user; receiving a keyword from the terminal of the first user via a keyword input field associated with the question bridge page; and searching existing question data using the keyword, and providing a duplicate question data and question registration request field to the terminal of the first user.

According to another aspect of the present invention, there is provided a method of relaying a one-to-one question and answer which is performed in a network via a one-to-one question and answer relay system, the method including: assigning user identifier search and selection information to a terminal of a first user; providing a question bridge page to the terminal of the first user when at least one user identifier is selected; receiving question data from the terminal of the first user when a question registration request about a second user is received from the terminal of the first user; storing the received question data in an answer request area of the second user; and storing answer data about the question data in an answer check area of the first user, the answer data being received from a terminal of the second user.

Also, the step of storing the received data may transmit the question data to an additional user by using an additional user selection function when the question data is completely stored and an additional request is received from the first user, and may further include: providing a predetermined directory selection function to the terminal of the first user; providing the additional user selection function associated with a directory which is selected from the terminal of the first user; and storing the question data in an answer request area of the additional user when the additional user is selected.

According to still another aspect of the present invention, there is provided a one-to-one question and answer relay system using a network, the system including: an event component assigning event occurrence information to request for transmission of question data to a service webpage; a question bridge page provider providing a question bridge page to a terminal of a first user where an event based on the event occurrence information occurred; a question data receiver receiving the question data from the terminal of the first user when a question registration request about a second user is received from the terminal of the first user via the question bridge page; a question data storage component storing the received question data in an answer request area of the second user; and an answer data storage component storing answer data about the question data in an answer check area of the first user, the answer data being received from a terminal of the second user.

According to still another aspect of the present invention, there is provided a computerized method for providing one-to-one question and answer relay, the method comprising the steps of providing a user interface configured to allow a first user to search other users who have answered other questions and to send the first user's question to a second user among the searched users; transmitting said question to the second user in response to the first user's request; storing said question in a database; notifying the second user of said question; allowing the second user to input the second user's answer corresponding to said question; storing the second user's answer in the database; and notifying the first user of said answer.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
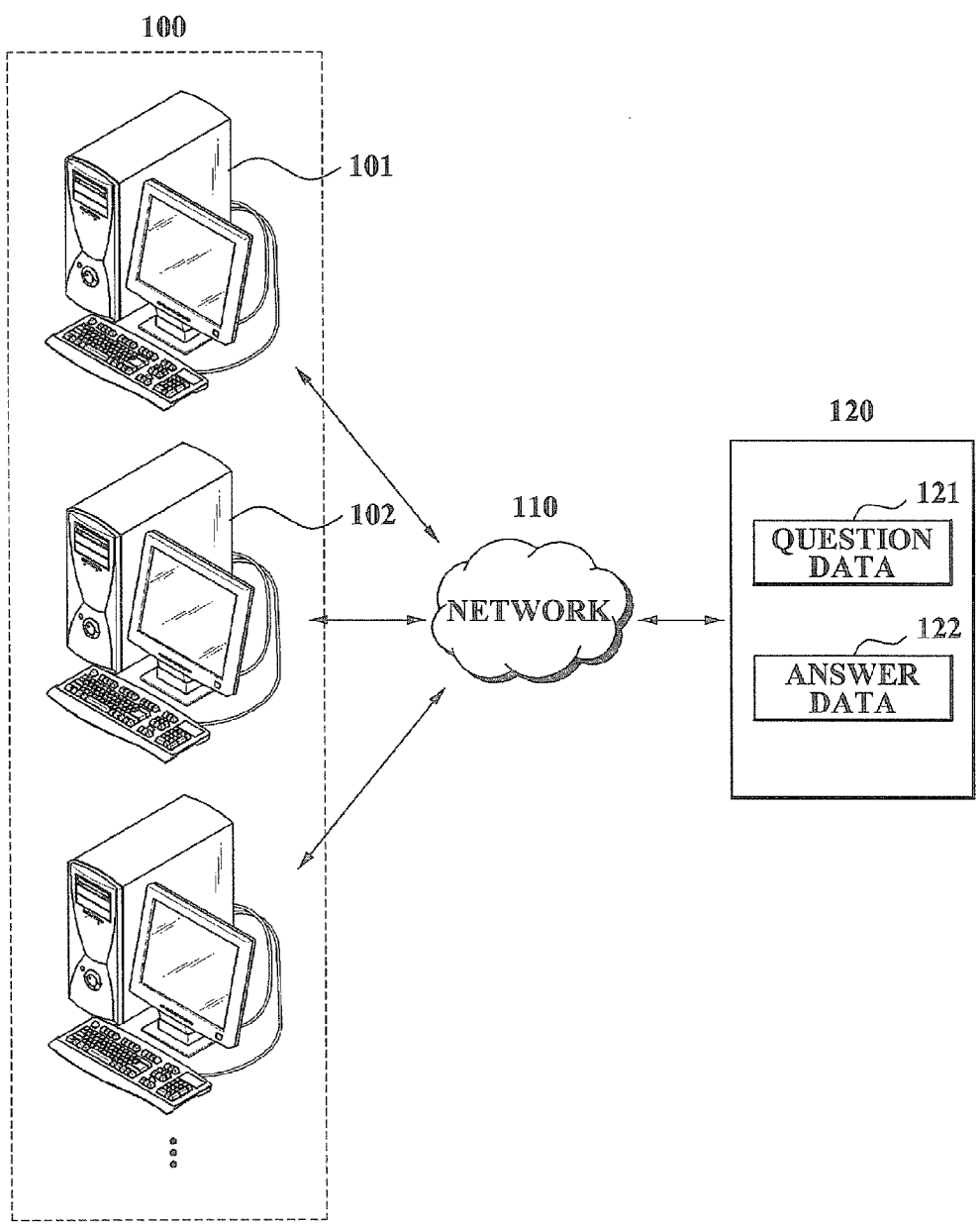
FIG. 1 is a diagram illustrating a system for relaying a question and an answer between user terminals in a network according to a conventional art.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more components can reside within a process and/or thread of execution, and a module or component can be localized on one computer and/or distributed between two or more computers.

As used herein, the terms "desktop," "PC," "local computer," and the like, refer to computers on which systems (and methods) according to the invention operate. In the illustrated embodiments, these are personal computers, such as portable computers and desktop computers; however, in other embodiments, they may be other types of computing devices (e.g., workstations, mainframes, personal digital assistants or PDAs, music or MP3 players, and the like).

Figure 2:
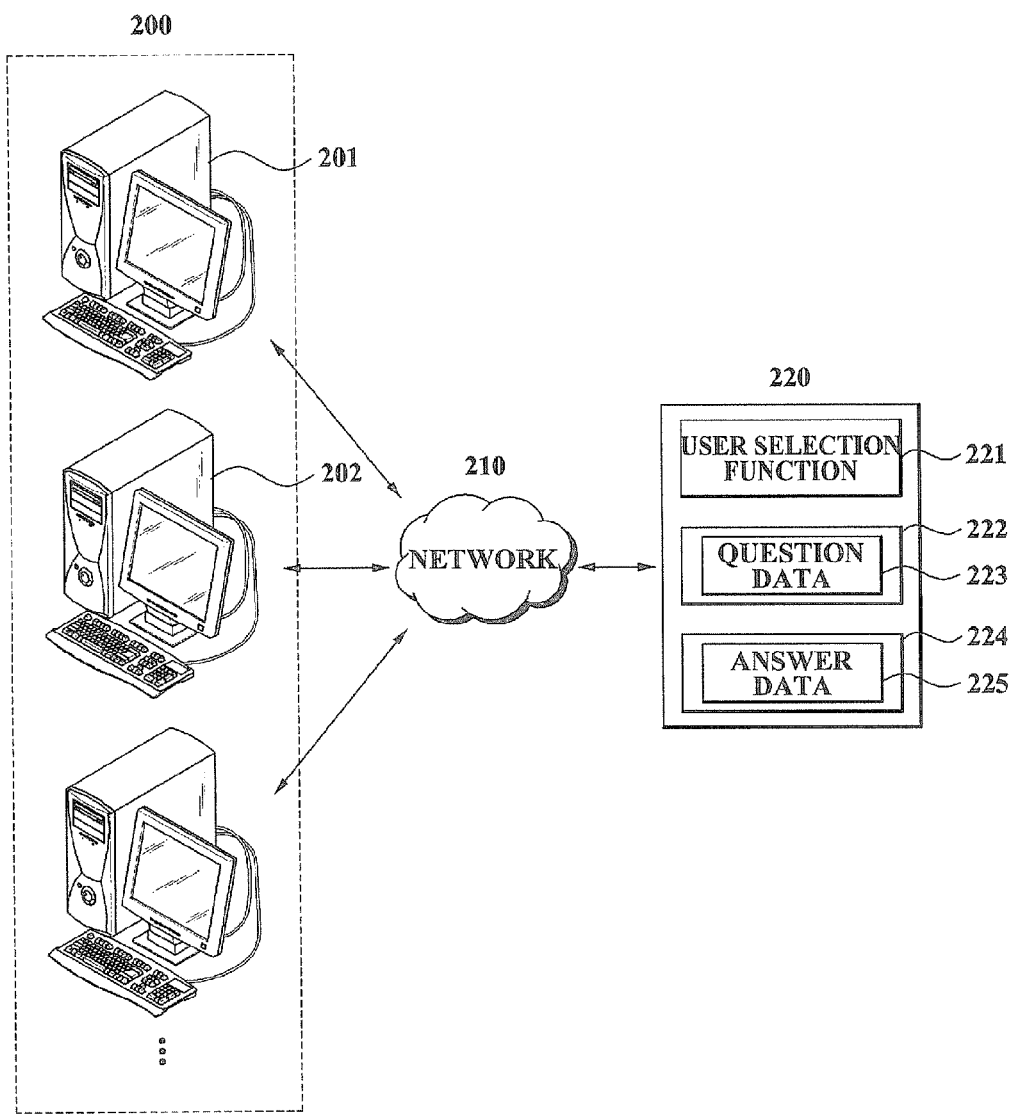
FIG. 2 is a diagram illustrating a system for selecting a user to transmit a question and relaying a one-to-one question and answer via a network according to an exemplary embodiment of the present invention.

FIG. 2 is a diagram illustrating a system for selecting a user to transmit a question and relaying a one-to-one question and answer via a network according to an exemplary embodiment of the present invention.

As shown in FIG. 2, a user may transmit/receive question data 223 and answer data 225 to a server 220 of a service provider via a network 210 using a user terminal 200. In this case, the server 220 provides a user selection function 221, and stores the question data 223 received from a first user terminal 201 in a user's answer request area 222 which is selected via the user selection function 221. Also, the server 220 stores the answer data 225 received from a second user terminal 202 in an answer check area 224 of a first user associated with the first user terminal 201.

As described above, a function capable of selecting a user to transmit a question is provided, and the question data 223 stored in the answer request area 222 and the answer data 225 stored in the answer check area 224 are relayed. Accordingly, it is possible to improve a probability that the first user may receive a desired answer to the question, reduce a time and effort that a second user may expend to search for the question to give an answer to, and also to improve a probability that the second user may receive a desired question.

Figure 3:
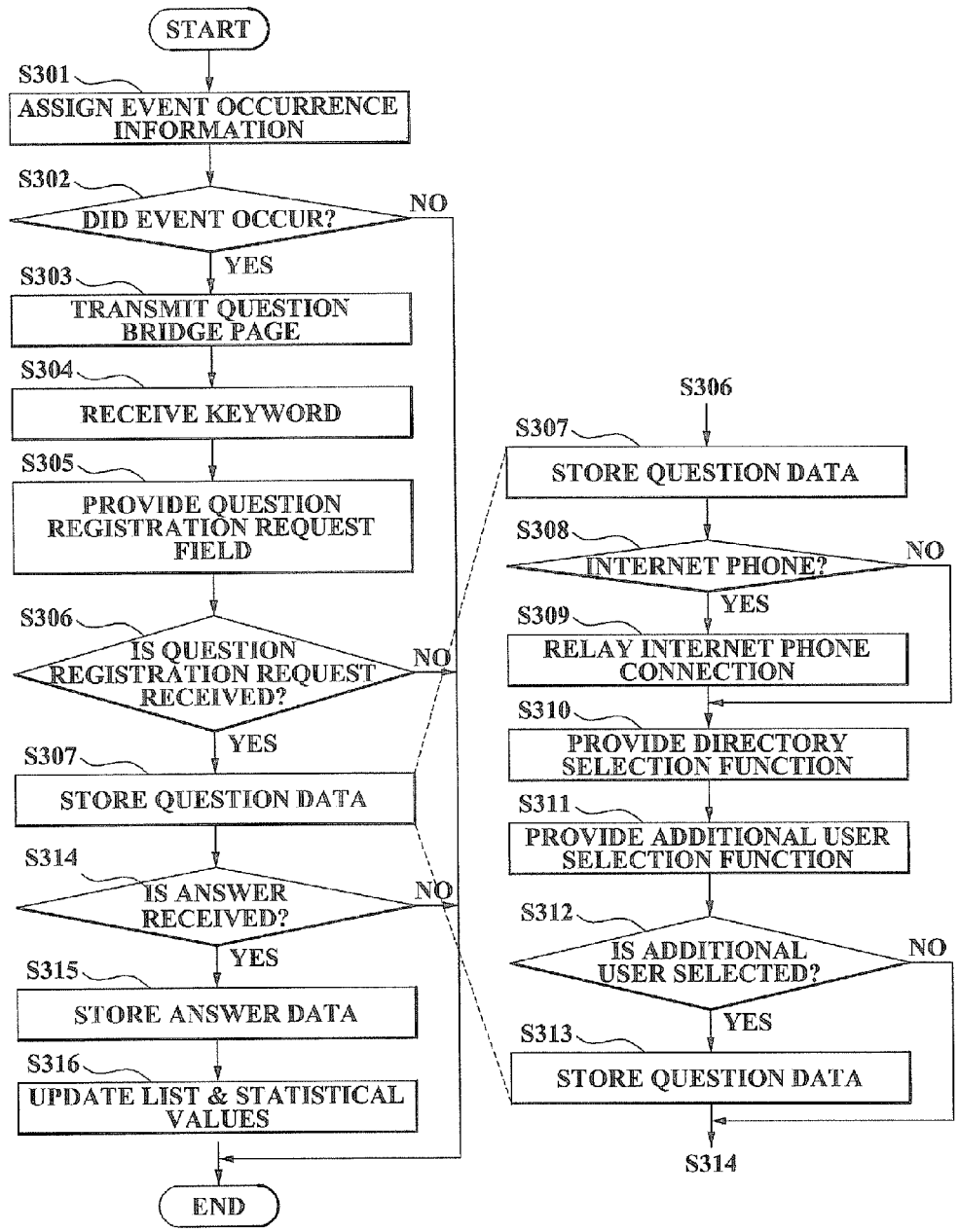
FIG. 3 is a flowchart illustrating a method of relaying a one-to-one question and answer by assigning event occurrence information to request for transmission of question data to a service webpage according to an exemplary embodiment of the present invention.

FIG. 3 is a flowchart illustrating a method of relaying a one-to-one question and answer by assigning event occurrence information to request for transmission of question data to a service webpage according to an exemplary embodiment of the present invention. In this instance, the method of relaying a one-to-one question and answer is performed by a one-to-one question and answer system according to the present invention. Also, as shown in FIG. 3, operations S308 through S313 may be further included in operation S307 and then performed.

In operation S301, event occurrence information to request for transmission of question data is assigned to a service webpage. In this instance, when a user identifier is displayed on the service webpage, the event occurrence information is assigned to the user identifier. Also, when the service web page corresponds to a user information page associated with the user identifier, the event occurrence information is assigned to the user information page.

In operation S302, whether an event occurred in a terminal of a first user is verified. In this instance, when no event occurred, the one-to-one question and answer relay method is terminated, and when the event occurred, operation S303 is performed.

In operation S303, a question bridge page is transmitted to the terminal of the first user. In this instance, the question bridge page may include a field of receiving a keyword to utilize as a title of the question data and a field of searching for a duplicate question to the question data using the keyword.

In operation S304, the keyword is received via the question bridge page.

In operation S305, a question registration request field for registering the found duplicate question data and question by using the keyword is provided to the terminal of the first user. In this instance, operation S305 may include transmitting a question input page, which includes the keyword as a title, and receiving the question data from the terminal of the first user via the question input page.

In operation S306, whether a question registration request is received from the terminal of the first user is verified. In this instance, when no question registration request is received, the one-to-one question and answer relay method is terminated, and when the question registration is received, operation S307 is performed.

In operation S307, the received question data is stored in an answer request area of a second user. In this instance, the answer request area may include 1) an answer request list corresponding to a list of question data received from a user, 2) a selection field for selecting whether to receive a question and selecting a predetermined number of daily receivable questions, and 3) statistical data of numerical values associated with a requested question. Also, in operation S307, when the question data is completely stored and an additional request is received from the first user, the question data may be transmitted to an additional user by using an additional user selection function.

When the first user and the second user are capable of utilizing an Internet phone and the first user selects a speech question function in operation S308, operation S309 is performed. Conversely, when either one of the first user and the second user are incapable of the Internet phone, or when the first user does not select the speech question function in operation S308, operation S310 is performed.

In operation S309, an Internet phone connection between the first user and the second user is relayed.

In operation S310, a directory selection function is provided to the terminal of the first user. In this instance, the directory selection function may include any one of 1) a function of selecting a directory where the service webpage is included, 2) a function of selecting a recommended directory in association with a keyword extracted from the question data, and 3) a function of searching for and selecting a directory.

In operation S311, an additional user selection function is provided. In this instance, the additional user selection function is associated with a directory which is selected from the terminal of the first user. Also, the additional user selection function may correspond to a function of selecting a user to additionally transmit the question data via any one of 1) a direct search field, 2) a recommended user selection field, and 3) a field of searching for and selecting a sponsor and an editor associated with the selected directory. Also, the recommended user selection field may include a field which arranges the additional user in an order of higher points in expert points by using the expert points associated with the selected directory, extracts a number of higher ranking additional users, and displays the additional user selection function on the terminal of the first user.

When the additional user is selected in the terminal of the first user via the additional user selection function in operation S312, operation S313 is performed. Conversely, when no additional user is selected, operation S314 is performed.

In operation S313, when the additional user is selected, the question data is also stored in an answer request area of the additional user.

In operation S314, whether an answer about the question data is received from the terminal of the second user is verified. When no answer is received, the one-to-one question and answer relay method is terminated. Conversely, when the answer is received, operation S315 is performed.

In operation S315, answer data about the question data, received from the terminal of the second user, is stored in the answer check area of the first user. In this instance, the answer check area may include 1) a user identifier of a user who recently gave a question, 2) statistical data of numerical values associated with the requested question, and 3) a question list corresponding to a list of question data generated by another user associated with the answer check area.

In operation S316, statistical values and a list associated with a question of the first user and an answer of the second user are updated.

Figure 4:
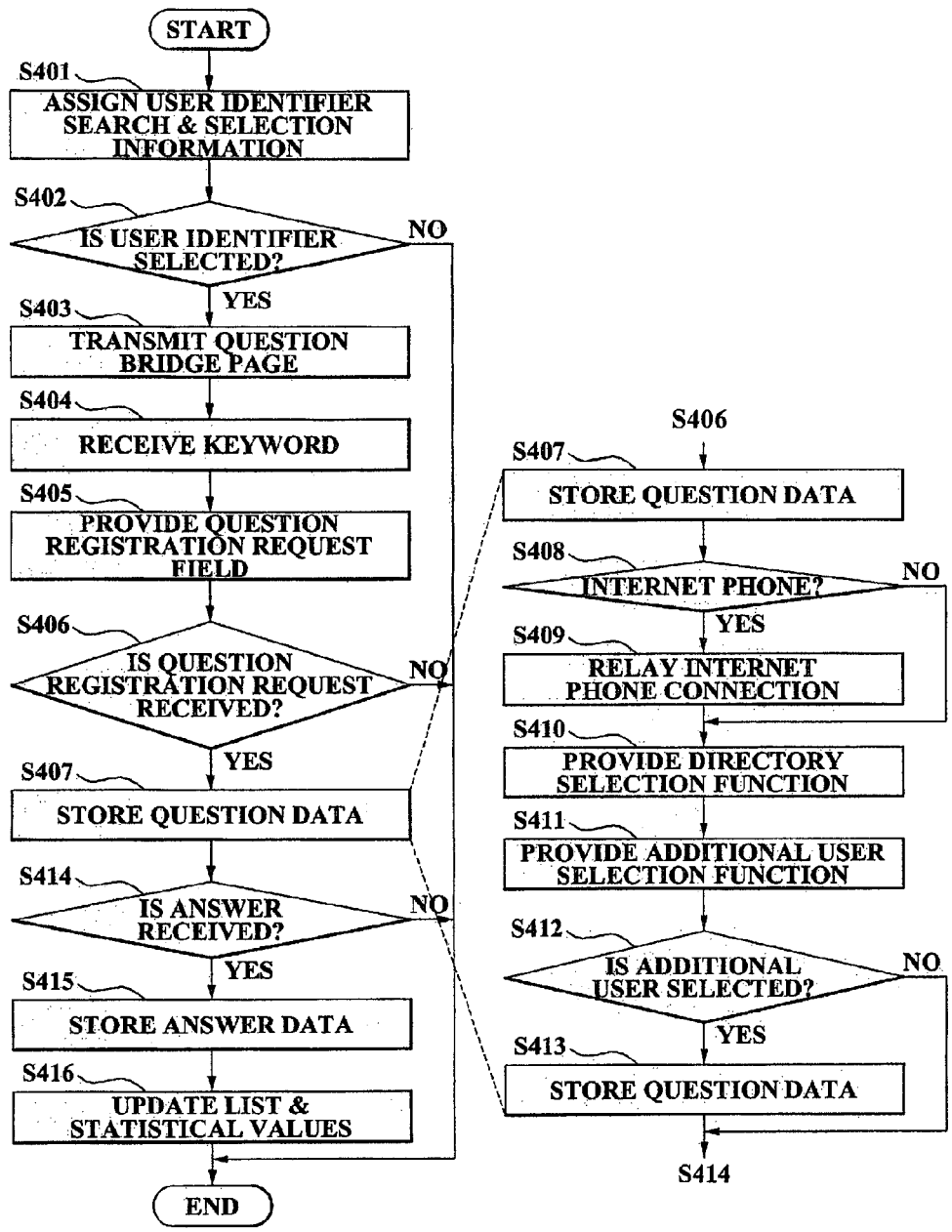
FIG. 4 is a flowchart illustrating a method of relaying a one-to-one question and answer by assigning user identifier search and selection information to a user terminal in a network according to an exemplary embodiment of the present invention.

FIG. 4 is a flowchart illustrating a method of relaying a one-to-one question and answer by assigning user identifier search and selection information to a user terminal in a network according to an exemplary embodiment of the present invention. In this instance, the method of relaying a one-to-one question and answer is performed by a one-to-one question and answer system according to the present invention. Also, as shown in FIG. 4, operations S408 through S413 may be further included in operation S407 and then performed.

In operation S401, user identifier search and selection information is assigned to a terminal of a first user.

When no user identifier is received from the terminal of the first user in operation S402, the one-to-one question and answer relay method is terminated. Conversely, when the user identifier is received, operation S403 is performed.

In operation S403, when at least one user identifier is selected, a question bridge page is provided to the terminal of the user terminal. In this instance, the question bridge page may include a field of receiving a keyword to utilize as a title of the question data and a field of searching for a duplicate question to the question data using the keyword.

In operation S404, the keyword is received via the question bridge page.

In operation S405, a question registration request field for registering the found duplicate question data and question by using the keyword is provided to the terminal of the first user. In this instance, operation S405 may include transmitting a question input page, which includes the keyword as a title, and receiving the question data from the terminal of the first user via the question input page.

In operation S406, whether a question registration request is received from the terminal of the first user is verified. In this instance, when no question registration request is received, the one-to-one question and answer relay method is terminated, and when the question registration is received, operation S407 is performed.

In operation S407, the received question data is stored in an answer request area of a second user. In this instance, the answer request area may include 1) an answer request list corresponding to a list of question data received from a user, 2) a selection field for selecting whether to receive a question and selecting a predetermined number of daily receivable questions, and 3) statistical data of numerical values associated with a requested question. Also, in operation S407, when the question data is completely stored and an additional request is received from the first user, the question data may be transmitted to an additional user by using an additional user selection function.

When the first user and the second user are capable of utilizing an Internet phone and the first user selects a speech question function in operation S408, operation S409 is performed. Conversely, when either one of the first user and the second user are incapable of the Internet phone, or when the first user does not select the speech question function in operation S408, operation S410 is performed.

In operation S409, an Internet phone connection between the first user and the second user is relayed.

In operation S410, a directory selection function is provided to the terminal of the first user. In this instance, the directory selection function may include any one of 1) a function of selecting a recommended directory in association with a keyword extracted from the question data, and 2) a function of searching for and selecting a directory.

In operation S411, an additional user selection function is provided. In this instance, the additional user selection function is associated with a directory which is selected from the terminal of the first user. Also, the additional user selection function may correspond to a function of selecting a user to additionally transmit the question data via any one of 1) a direct search field, 2) a recommended user selection field, and 3) a field of searching for and selecting a sponsor and an editor associated with the selected directory. Also, the recommended user selection field may include a field which arranges the additional user in an order of higher points in expert points by using the expert points associated with the selected directory, extracts a number of higher ranking additional users, and displays the additional user selection function on the terminal of the first user.

When the additional user is selected in the terminal of the first user via the additional user selection function in operation S412, operation S413 is performed. Conversely, when no additional user is selected, operation S414 is performed.

In operation S413, when the additional user is selected, the question data is also stored in an answer request area of the additional user.

In operation S414, whether an answer about the question data is received from the terminal of the second user is verified. When no answer is received, the one-to-one question and answer relay method is terminated. Conversely, when the answer is received, operation S415 is performed.

In operation S415, answer data about the question data, received from the terminal of the second user, is stored in the answer check area of the first user. In this instance, the answer check area may include 1) a user identifier of a user who recently gave a question, 2) statistical data of numerical values associated with the requested question, and 3) a question list corresponding to a list of question data generated by another user associated with the answer check area.

In operation S416, statistical values and a list associated with a question of the first user and an answer of the second user are updated.

Figure 5:
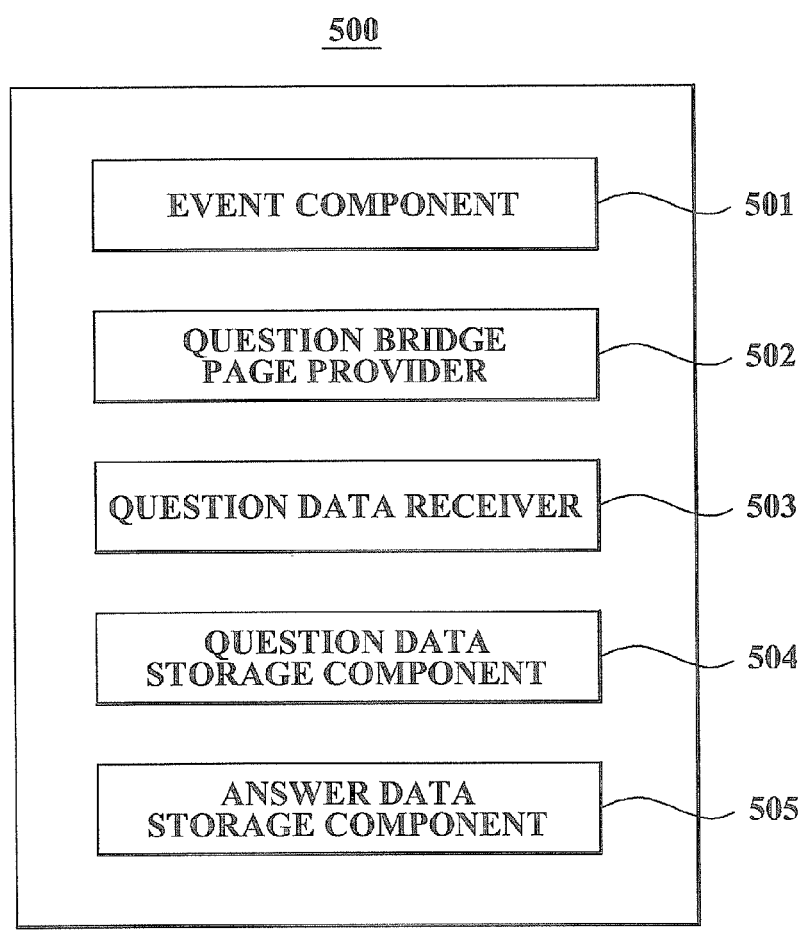
FIG. 5 is a block diagram illustrating an internal configuration of a system for relaying a one-to-one question and answer by assigning event occurrence information to request for transmission of question data to a service webpage according to an exemplary embodiment of the present invention.

FIG. 5 is a block diagram illustrating an internal configuration of a system for relaying a one-to-one question and answer by assigning event occurrence information to request for transmission of question data to a service webpage according to an exemplary embodiment of the present invention. As shown in FIG. 5, a one-to-one question and answer relay system 500 may include an event component 501, a question bridge page provider 502, a question data receiver 503, a question data storage component 504, and an answer data storage component 505.

The event component 501 assigns event occurrence information to request for transmission of question data to a service webpage. In this instance, when a user identifier is displayed on the service webpage, the event component 501 assigns the event occurrence information to the user identifier. Also, when the service web page corresponds to a user information page associated with the user identifier, the event component 501 assigns the event occurrence information to the user information page.

The question bridge page provider 502 provides a question bridge page to a terminal of a first user where an event based on the event occurrence information occurred.

The question data receiver 503 receives the question data from the terminal of the first user when a question registration request about a second user is received from the terminal of the first user via the question bridge page The question data storage component 504 stores the received question data in an answer request area of the second user. In this instance, when the question data is completely stored and an additional request is received from the first user, the question data storage component 504 transmits the question data to an additional user by using an additional user selection function.

The answer data storage component 505 stores answer data about the question data in an answer check area of the first user. The answer data is received from a terminal of the second user.

As described above, the question data is stored in the answer request area of the second user corresponding to a selected particular user, and answer data of the second user is stored in the answer check area of the first user. Accordingly, it is possible to improve a probability that the first user may receive a desired answer to the question, reduce a time and effort that a second user may expend to search for the question to give an answer to, and also to improve a probability that the second user may receive a desired question.

Figure 6:
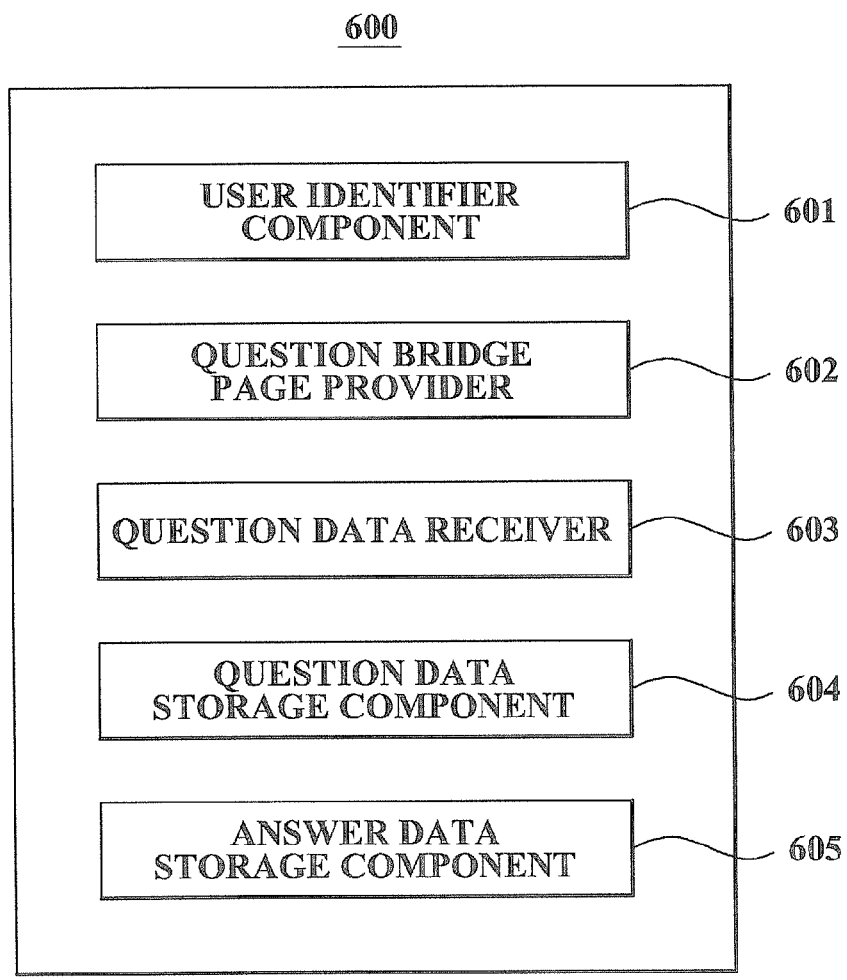
FIG. 6 is a block diagram illustrating an internal configuration of a system for relaying a one-to-one question and answer by assigning user identifier search and selection information to a user terminal in a network according to an exemplary embodiment of the present invention.

FIG. 6 is a block diagram illustrating an internal configuration of a system for relaying a one-to-one question and answer by assigning user identifier search and selection information to a user terminal in a network according to an exemplary embodiment of the present invention. As shown in FIG. 6, a one-to-one question and answer system 600 may include a user identifier component 601, a question bridge page provider 602, a question data receiver 603, a question data storage component 604, and an answer data storage component 605.

The user identifier component 601 provides a user identifier search and selection function to a terminal of a first user.

The question bridge page provider 602 provides a question bridge page to the terminal of the first user when at least one user identifier is selected.

The question data receiver 603 receives the question data from the terminal of the first user when a question registration request about a second user is received from the terminal of the first user via the question bridge page The question data storage component 604 stores the received question data in an answer request area of the second user. In this instance, when the question data is completely stored and an additional request is received from the first user, the question data storage component 604 transmits the question data to an additional user by using an additional user selection function.

The answer data storage component 605 stores answer data about the question data in an answer check area of the first user. The answer data is received from a terminal of the second user.

Figure 7:
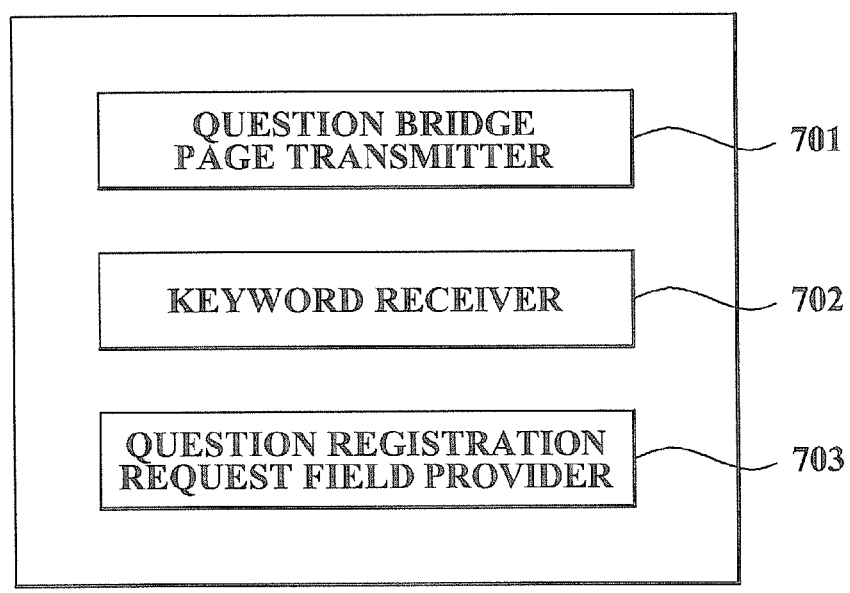
FIG. 7 is a block diagram illustrating an internal configuration of a question bridge page provider according to an exemplary embodiment of the present invention.

FIG. 7 is a block diagram illustrating an internal configuration of a question bridge page provider according to an exemplary embodiment of the present invention. As shown in FIG. 7, each of the question bridge page providers 502 and 602 may include a question bridge page transmitter 701, a keyword receiver 702, and a question registration request field provider 703.

The question bridge page transmitter 701 transmits the question bridge page to the terminal of the first user.

The keyword receiver 702 receives a keyword from the terminal of the first user via a keyword input field associated with the question bridge page.

The question registration request field provider 703 searches existing question data using the keyword, and provides a duplicate question data and question registration request field to the terminal of the first user.

In this instance, when the first user finds a desired answer from the duplicate question data, which is found by performing a duplicate check using the keyword, the first user may more quickly acquire the desired answer.

Figure 8:
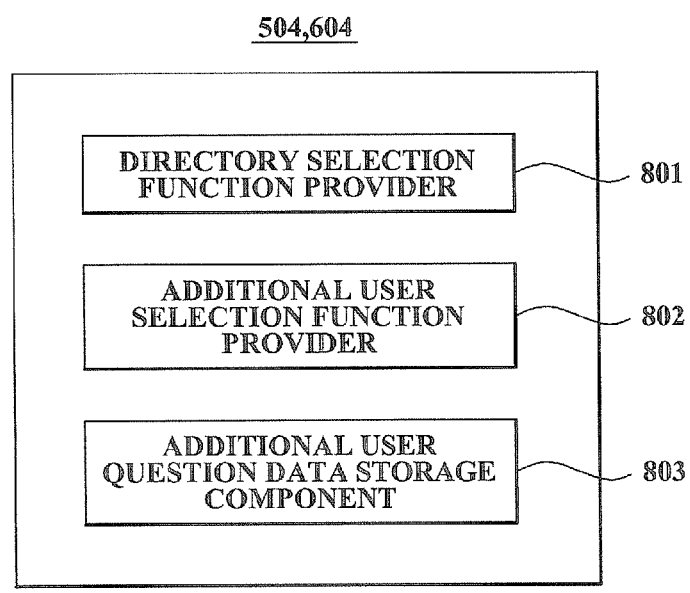
FIG. 8 is a block diagram illustrating an internal configuration of a question data storage component according to an exemplary embodiment of the present invention.

FIG. 8 is a block diagram illustrating an internal configuration of a question data storage component according to an exemplary embodiment of the present invention. As shown in FIG. 8, each of the question data storage components 504 and 604 may further include a directory selection function provider 801, an additional user selection function provider 802, and an additional user question data storage component 803.

The directory selection function provider 801 provides a predetermined directory selection function to the terminal of the first user.

The additional user selection function provider 802 provides the additional user selection function associated with a directory which is selected from the terminal of the first user.

The additional user question data storage component 803 stores the question data in an answer request area of the additional user when the additional user is selected.

As described above, it is possible to improve a probability that a user may acquire a desired answer by transmitting the question data to a plurality of users, each of who may give an answer.

Figure 9:
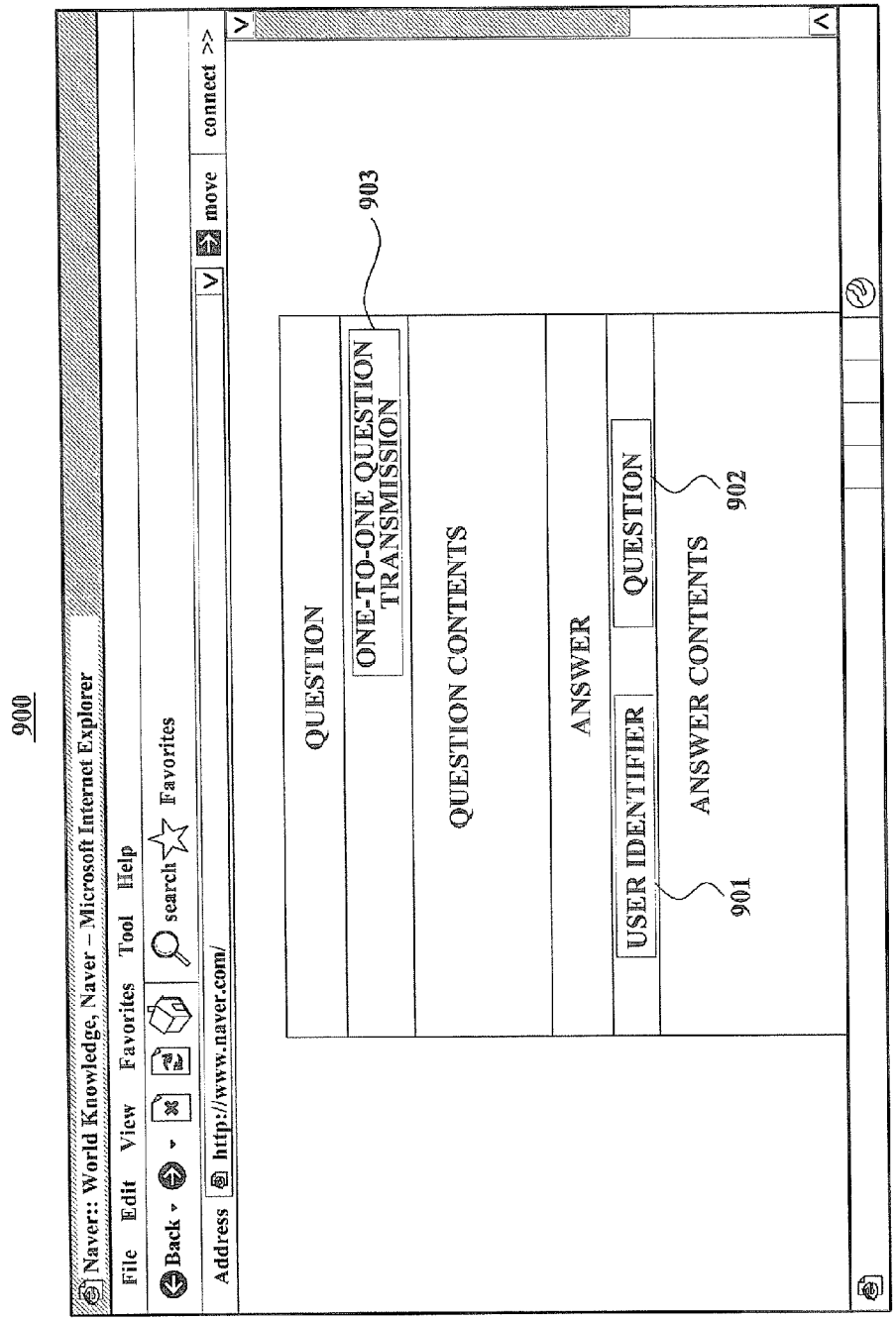
FIG. 9 illustrates an example of a method of assigning event occurrence information to a service webpage according to an exemplary embodiment of the present invention.

FIG. 9 illustrates an example of a method of assigning event occurrence information to a service webpage according to an exemplary embodiment of the present invention.

As shown in FIG. 9, by posting event occurrence information 902 next to a user identifier 901 of a second user corresponding to an answerer of an answer displayed on a service webpage 900, a first user may directly transmit a question to the second user who gave an answer associated with the question. As described above, the question is directly transmitted to the second user who gave an answer associated with the question. Accordingly, it is possible to improve a probability that the first user may receive a desired answer to the question, reduce a time and effort that a second user may expend to search for the question to give an answer to, and also to improve a probability that the second user may receive a desired question.

Also, even when the question is completed by receiving the answer from the second user, a third user who provides question data on the service webpage 900 may transmit the question data of the question to a fourth user by using a one-to-one question transmission field 903.

Figure 10:
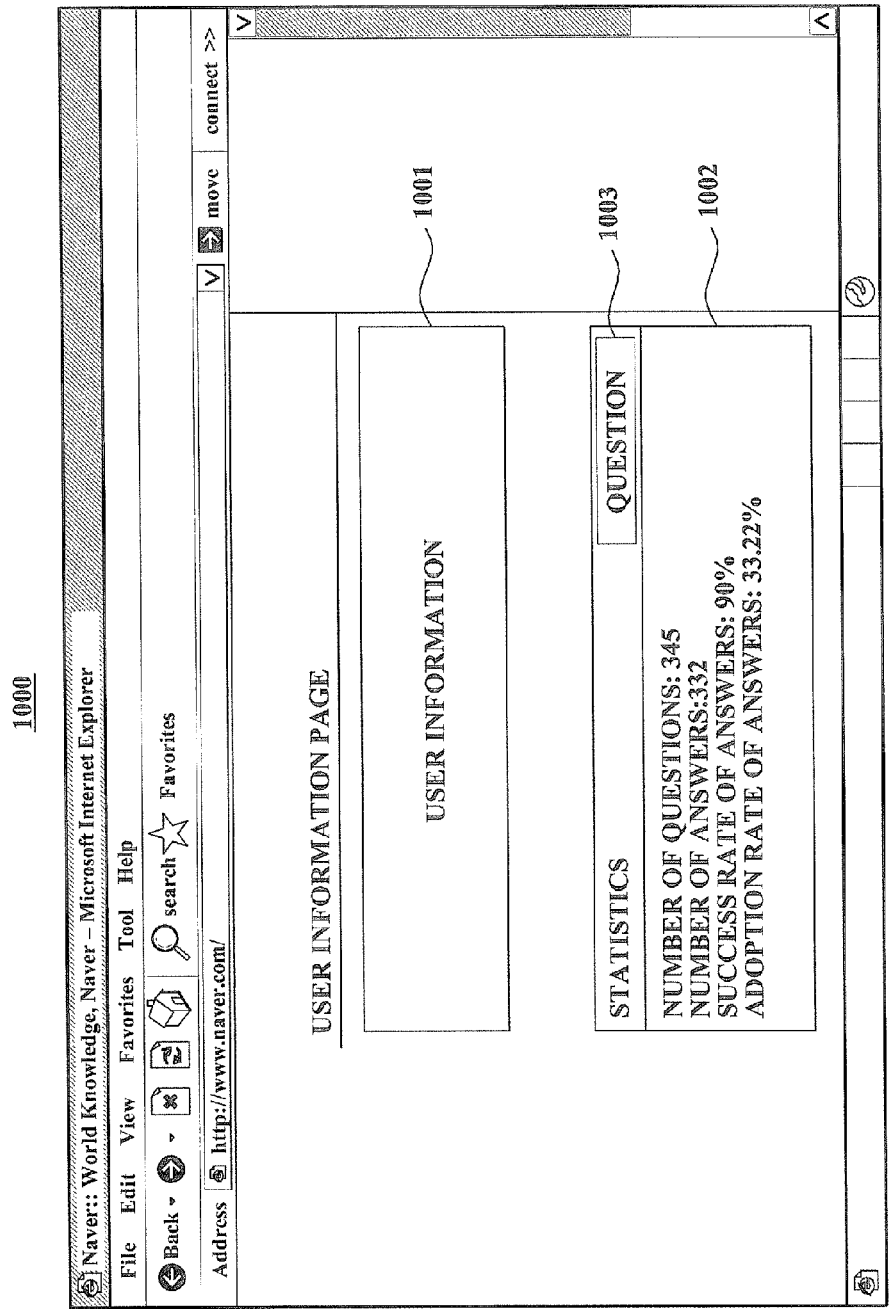
FIG. 10 is a diagram illustrating another example of a method of assigning event occurrence information to a service webpage according to an exemplary embodiment of the present invention.

FIG. 10 is a diagram illustrating another example of a method of assigning event occurrence information to a service webpage according to an exemplary embodiment of the present invention.

As shown in FIG. 10, when a first user enters a user information page of a second user to acquire detailed information about the second user, a service webpage 1000 may acquire information associated with the second user via user information 1001 and question statistics 1002, and directly transmit question data to the second user via event occurrence information 1003. In this instance, the second user corresponds to an answerer whom the first user desires to transmit the question data. As described above, the question data is transmitted after acquiring the detailed information associated with the question data of the second user and thus the first user may acquire a more satisfactory answer.

Figure 11:
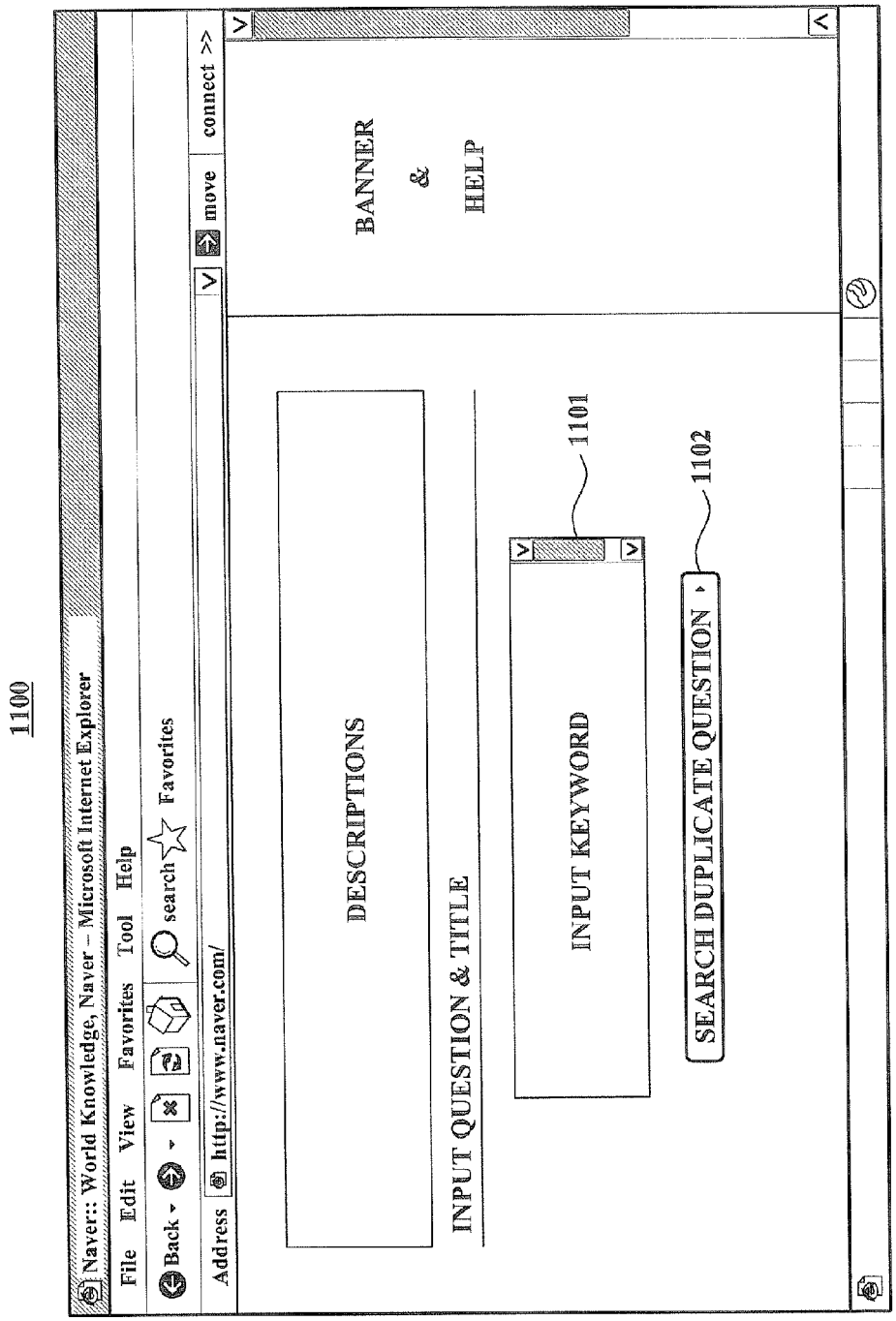
FIG. 11 illustrates an example of a question bridge page according to an exemplary embodiment of the present invention.

FIG. 11 illustrates an example of a question bridge page according to an exemplary embodiment of the present invention. As shown in FIG. 11, a question bridge page 1100 may include a keyword input field 1101 and a duplicate question search field 1102.

The keyword input field 1101 is utilized as a title of a question and receives a keyword from a terminal of a first user who is a questioner. In this instance, the keyword is utilized to search for duplicate question data.

The duplicate question search field 1102 searches for duplicate question data using the keyword. In this instance, when the first user's desired answer is found from the duplicate question data that are found through a duplicate check using the keyword, the first user may more quickly acquire the desired answer.

Figure 12:
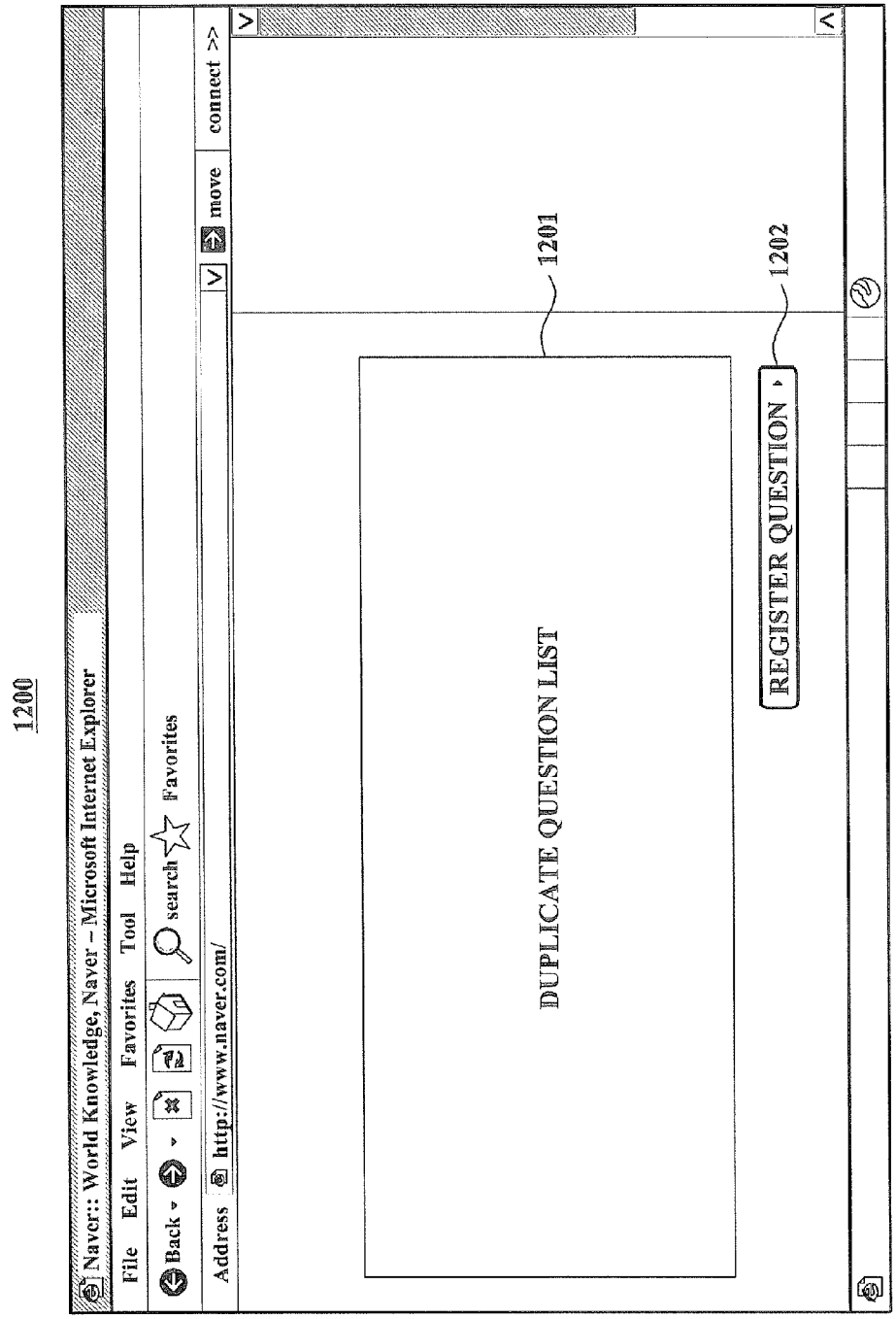
FIG. 12 illustrates an example of a method of verifying a duplication of question data and providing a question registration procedure for a user according to an exemplary embodiment of the present invention.

FIG. 12 illustrates an example of a service webpage of verifying a duplication of question data and providing a question registration procedure for a user according to an exemplary embodiment of the present invention. As shown in FIG. 12, a duplication check screen 1200 may include a duplicate question list 1201 and a question registration field 1202.

The duplicate question list 1201 includes duplicate question data which contains duplicate contents with a keyword to be utilized as a title of question data. In this instance, a first user corresponding to a questioner may select an answer associated with the question data from the duplicate question list 1201.

The question registration field 1202 registers the question data when a desired answer is not found from the duplicate question list 1201. In this instance, when a second user corresponding to an answerer is initially selected, a question is generated and the question data is transmitted to the second user. Conversely, when the question is generated, and the second user is unselected, a view changes into a user selection screen.

Figure 13:
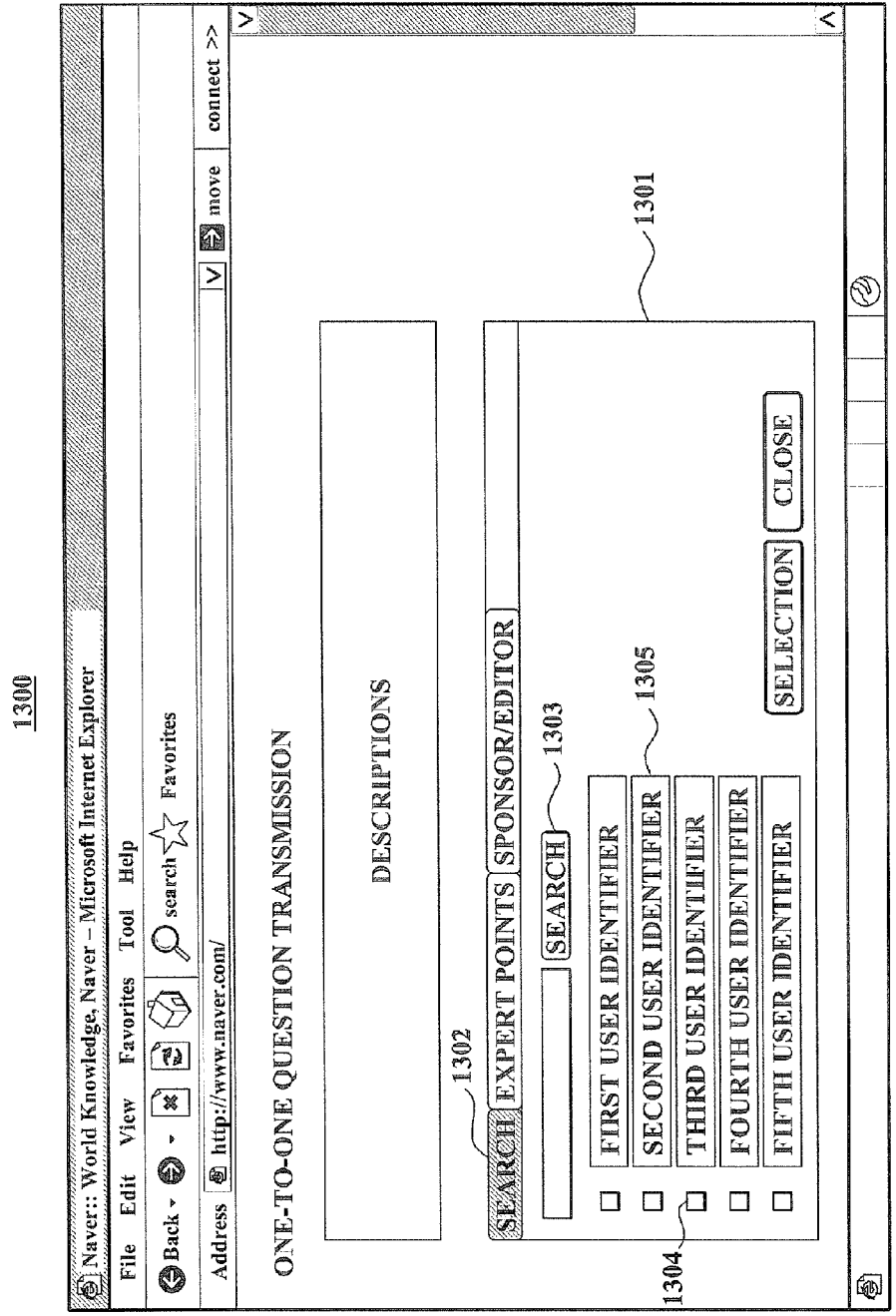
FIG. 13 illustrates an example of a method of selecting an additional user even when a user's question data is completely stored, and transmitting the question data according to an exemplary embodiment of the present invention.

FIG. 13 illustrates an example of a service webpage of selecting an additional user even when a user's question data is completely stored, and transmitting the question data according to an exemplary embodiment of the present invention.

In a one-to-one question transmission page 1300, the completely stored question data may be transmitted to the selected additional user via an additional user selection field 1301. In this instance, the additional user selection field 1301 may search for a desired user via a direct search field 1302 and select a desired user identifier 1305 via a check box. As described above, it is possible to improve a probability that a user may acquire a desired answer by transmitting the question data to a plurality of users, each of who may give an answer.

Figure 14:
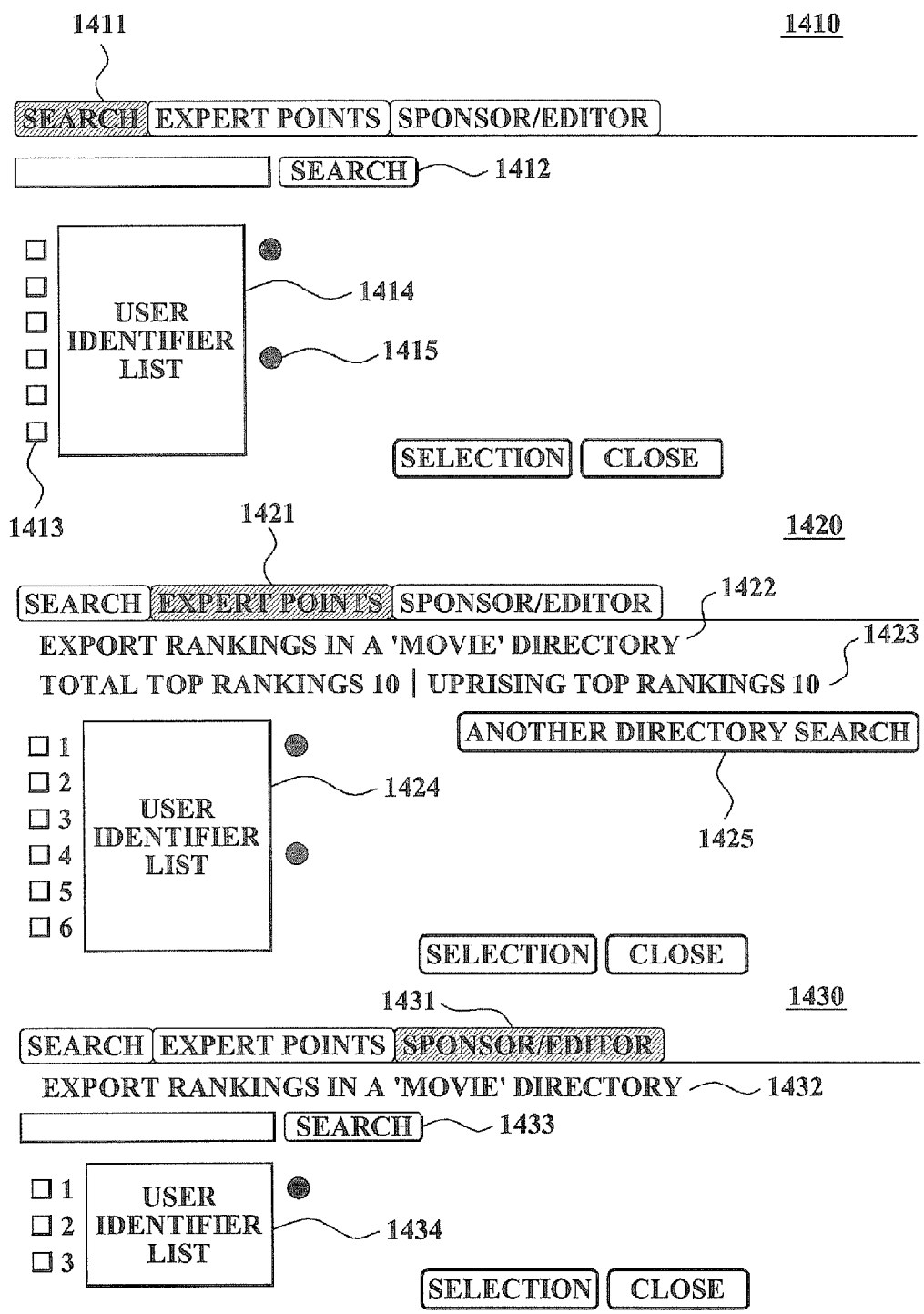
FIG. 14 illustrates an example of a method of providing a user identifier search or selection function for a user according to an exemplary embodiment of the present invention.

FIG. 14 illustrates an example of a user search window of providing a user identifier search or selection function for a user according to an exemplary embodiment of the present invention.

Referring to a first user search window 1410, when a direct search field 1411 is selected, a first user corresponding to a questioner may directly search 1412 for a second user corresponding to an answerer and select the second user from a user identifier list 1414 via a check box 1413. Also, when an Internet phone icon 1415 is marked next to a user identifier of the second user, the first user may transmit question data to the second user and receive answer data from the second user in speech via an Internet phone.

Referring to a second user search window 1420, when an expert index field 1421 is selected, the first user may arrange user identifiers using expert points 1423 associated with a selected directory 1422. In this instance, the first user may select the second user from the user identifier list 1424. Also, the first user may acquire another user identifier list of another directory using another directory search field 1425.

Referring to a third user search window 1430, when a sponsor and editor 1431 field is selected, the first user may select the second user by searching 1433 for a sponsor and editor associated with a selected directory 1432, or may select the second user by using a user identifier list 1434 of a recommended sponsor and editor.

As described above, it is possible to more quickly find the second user capable of providing an appropriate answer for the first user's question via the user search or selection function.

Figure 15:
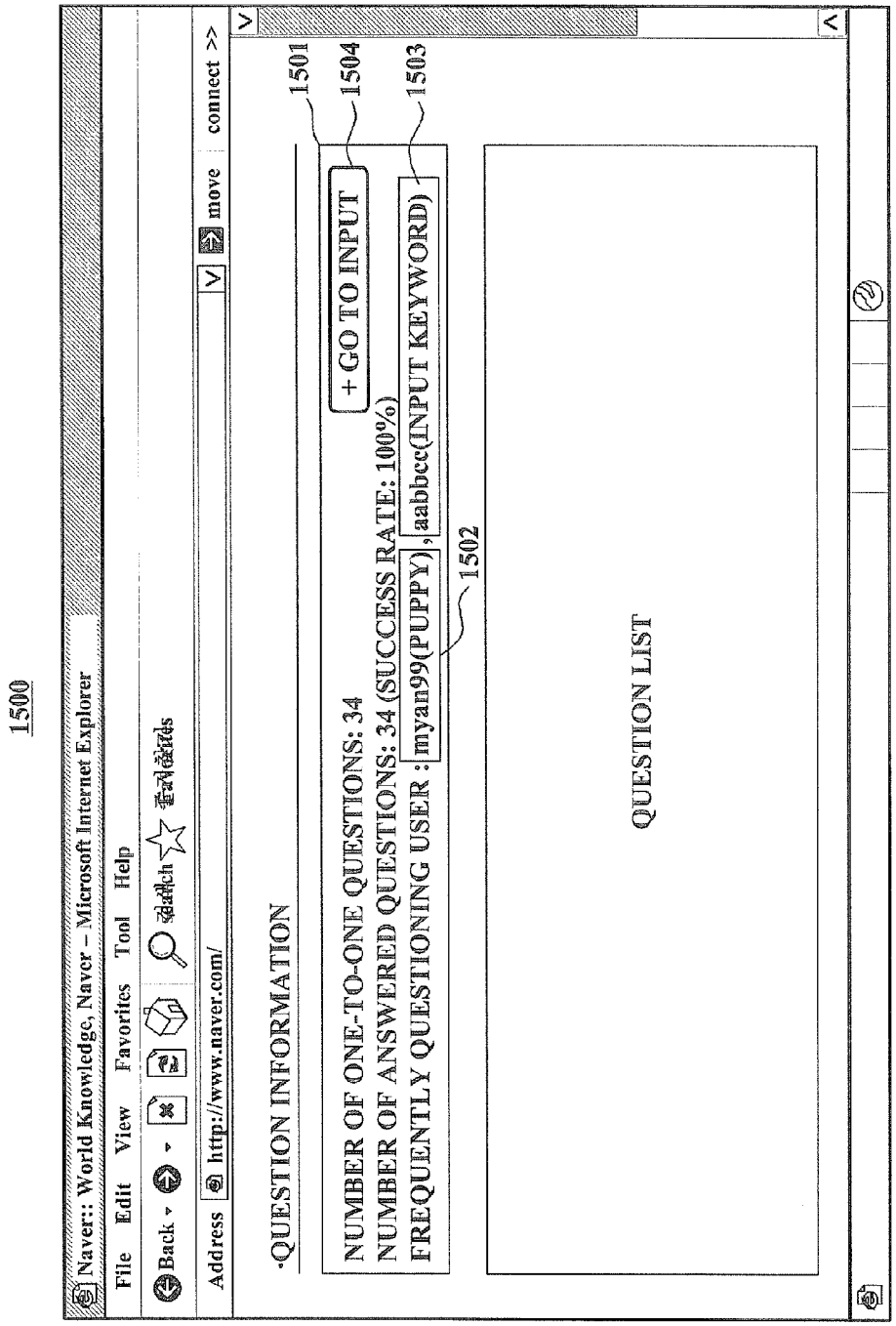
FIG. 15 illustrates an example of a method of providing question information of a user and statistical data according to an exemplary embodiment of the present invention.

FIG. 15 illustrates an example of a method of providing question information of a user and statistical data according to an exemplary embodiment of the present invention.

As shown in FIG. 15, a question information page 1500 may include information, such as a number of questions, a number of answers, a frequently asking user, and the like, in a question information field 1501. In this instance, a user identifier of the frequently asking user and a keyword associated with question data, which is transmitted to the user, may be displayed 1502 or only the user identifier may be displayed 1503. The user identifier of a user who received the question most recently may be displayed. Also, it is possible to move to a page of managing a frequently asking user via a user input field 1504.

Figure 16:
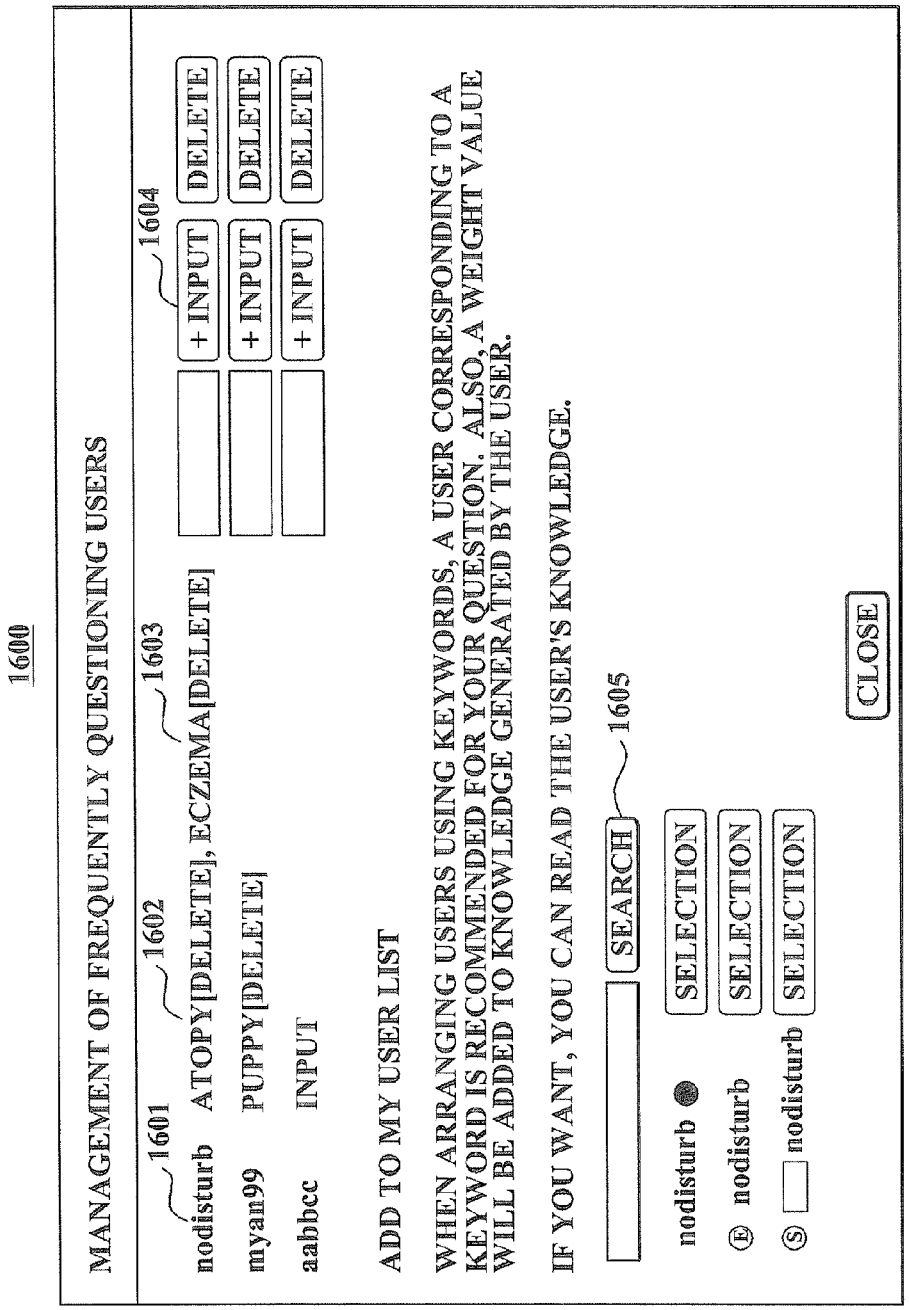
FIG. 16 illustrates an example of a user management page according to an exemplary embodiment of the present invention.

FIG. 16 illustrates an example of a user management page according to an exemplary embodiment of the present invention.

A user management page 1600 may manage a frequently asking user in association with a user identifier 1601 and a keyword 1602. Also, the user management page 1600 provides a function capable of entering a plurality of keywords 1602 and 1603. In this instance, the user identifier 1601 may be selected via a user identifier search 1605.

As described above, it is possible to reduce a time and effort expended to find a user to transmit a question by storing and managing the user identifier 1601, and the plurality of keywords 1602 and 1603.

The one-to-one question and answer relay method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, it is possible to enable a first user to select a second user who generated an answer associated with a question of the first user while reading a service webpage associated with questions and answers, and to transmit the question to the second user, and thereby improve a probability that the first user may receive a desired answer to the question, and also to reduce a time and effort that the second user may expend to search for the question to give an answer to, and to improve a probability that the second user may receive a desired question.

Also, according to the present invention, it is possible to provide a method of directly transmitting a question to a particular user, and thereby make a user who receives the question generate an answer of a high quality without a compulsion, and with a responsibility.

Also, according to the present invention, it is possible to improve a probability that a service provider may transmit an answer about a question to a questioner via the above-described method, and to increase a number of answers and improve the quality of the question and answer. Accordingly, users may be more satisfied with questions and answers and thus a great number of users may utilize a service of the service provider.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

What is claimed is:

1. A computerized method of relaying a one-to-one question and answer which is performed in a network via a one-to-one question and answer relay system, the method comprising:
    assigning event occurrence information to a request for the transmission of question data to a service webpage;
    providing a question bridge page to a terminal of a first user, where an event based on the event occurrence information occurred;
    receiving the question data from the terminal of the first user, via the question bridge page;
    providing a directory selection function to the terminal of the first user, the directory selection function enabling the first user to select a directory;
    providing an additional user selection function associated with the directory selected by the first user using the directory selection function, the additional user selection function enabling the first user to select a second user associated with the selected directory, based on information of the second user provided to the first user, the provided information comprising at least one of a success rate of the second user's previous answers and an adopted rate of the second user's previous answers;
    storing the received question data in an answer request area of the second user; and
    storing answer data about the question data in an answer check area of the first user, the answer data being received from a terminal of the second user,
    wherein the additional user selection function arranges the users of the selected directory in a recommended user selection field, the users being arranged according to expert points associated with the users of the selected directory, and
    wherein the answer request area comprises at least one of 1) an answer request list corresponding to a list of question data received from the first user, 2) a selection field for selecting whether to receive a question and selecting a number of daily receivable questions, and 3) statistical data of numerical values associated with a requested question.

2. The method of claim 1, wherein the assigning comprises assigning the event occurrence information to a user identifier, when the user identifier is displayed on the service webpage, and assigning the event occurrence information to a user information page associated with the user identifier, when the service web page corresponds to the user information page.

3. The method of claim 1, wherein the providing comprises:
    transmitting the question bridge page to the terminal of the first user;

receiving a keyword from the terminal of the first user via a keyword input field associated with the question bridge page; and searching existing question data using the keyword, and providing a duplicate question data and question registration request field to the terminal of the first user.

4. The method of claim 1, further comprising storing the question data in an answer request area of an additional user selected by the first user, from the selected directory.

5. The method of claim 4, wherein the directory selection function comprises any one of a function of selecting a recommended directory in association with a keyword extracted from the question data, and a function of searching for and selecting a directory.

6. The method of claim 4, wherein the additional user selection function corresponds to a function of selecting a user to additionally transmit the question data via any one of a direct search field, and a field of searching for and selecting a sponsor and an editor associated with the selected directory.

7. The method of claim 1, wherein the recommended user selection field comprises a field which arranges the users such that users with a higher number of the expert points appear before users with a lower number of the expert points.

8. The method of claim 1, wherein the storing the received question data further comprises relaying an Internet phone connection between the first user and the second user, when the first user and the second user are capable of utilizing an Internet phone and the first user selects a speech question function.

9. The method of claim 1, wherein the receiving the question data comprises:

transmitting a question input page to the terminal of the first user, the question input page including the keyword as a title; and receiving the question data from the terminal of the first user via the question input page.

10. The method of claim 1, wherein the answer check area comprises 1) a user identifier of a user who recently gave a question, 2) statistical data of numerical values associated with the requested question, and 3) a question list corresponding to a list of question data generated by another user associated with the answer check area.

11. The method of claim 1, wherein the storing the received answer data comprises:

storing the answer data, received from the terminal of the second user, in the answer check area; and updating statistical values and a list associated with a question of the first user and an answer of the second user.

12. A computer-readable recording medium storing a program for implementing the method according to claim 1.

13. A computerized method of relaying a one-to-one question and answer that is performed in a network via a one-to-one question and answer relay system, the method comprising:

assigning user identifier search and selection information to a terminal of a first user;

providing a question bridge page to the terminal of the first user, when at least one user identifier is selected;

receiving question data from the terminal of the first user when a question registration request is received from the terminal of the first user;

providing a directory selection function to the terminal of the first user, the directory selection function enabling the first user to select a directory;

providing an additional user selection function associated with the directory selected by the first user using the directory selection function, the additional user selection function enabling the first user to select a second user associated with the selected directory, based on information of the second user provided to the first user, the provided information comprising at least one of a success rate of the second user's previous answers and an adopted rate of the second user's previous answers;

storing the received question data in an answer request area of the second user; and storing answer data about the question data in an answer check area of the first user, the answer data being received from a terminal of the second user, wherein the additional user selection function arranges users of the selected directory, according to the expert points associated with each of the users, and wherein the answer request area comprises at least one of 1) an answer request list corresponding to a list of question data received from a user, 2) a selection field for selecting whether to receive a question and selecting a number of daily receivable questions, and 3) statistical data of numerical values associated with a requested question.

14. The method of claim 13, wherein the providing comprises:

transmitting the question bridge page to the terminal of the first user;

receiving a keyword from the terminal of the first user via a keyword input field associated with the question bridge page; and searching existing question data using the keyword, and providing a duplicate question data and question registration request field to the terminal of the first user.

15. The method of claim 13, wherein the storing the received data transmits the question data to an additional user by using an additional user selection function, when the question data is completely stored and an additional request is received from the first user, and further comprises storing the question data in an answer request area of the additional user selected by the first user, from the selected directory.

16. A one-to-one question and answer relay system using a network, the system comprising:

an event component configured to assign event occurrence information to request for transmission of question data to a service webpage;

a question bridge page provider for providing a question bridge page to a terminal of a first user, where an event based on the event occurrence information occurred;

a question data receiver for receiving the question data from the terminal of the first user, when a question registration request designating a second user as a recipient of the question data is received from the terminal of the first user, via the question bridge page;

a directory selection function provider for providing a directory selection function to the terminal of the first user, the directory selection function enabling the first user to select a directory;

an additional user selection function provider for providing an additional user selection function associated with the directory selected by the user to the terminal of the first user, the additional user selection function enabling the first user to select a second user associated with the selected directory, based on information of the second user provided to the first user, the provided information comprising at least one of a success rate of the second user's previous answers and an adopted rate of the second user's previous answers;

a question data storage component adapted to store the received question data in an answer request area of the second user; and an answer data storage component adapted to store answer data about the question data in an answer check area of the first user, the answer data being received from a terminal of the second user, wherein the additional user selection function provider arranges users of the selected directory, according to the expert points associated with each of the users, and wherein the answer request area comprises at least one of 1) an answer request list corresponding to a list of question data received from a user, 2) a selection field for selecting whether to receive a question and selecting a number of daily receivable questions, and 3) statistical data of numerical values associated with a requested question.

17. The system of claim 16, wherein the event component assigns the event occurrence information to a user identifier when the user identifier is displayed on the service webpage, and assigns the event occurrence information to a user information page associated with the user identifier when the service web page corresponds to the user information page.

18. The system of claim 16, wherein the question bridge page provider comprises:
   a question bridge page transmitter transmitting the question bridge page to the terminal of the first user;
   a keyword receiver receiving a keyword from the terminal of the first user via a keyword input field associated with the question bridge page; and
   a question registration request field provider searching existing question data using the keyword, and providing a duplicate question data and question registration request field to the terminal of the first user.

19. The system of claim 16, wherein the question data storage component transmits the question data to an additional user by using an additional user selection function when the question data is completely stored and an additional request is received from the first user, and further comprises:
   an additional user question data storage component storing the question data in an answer request area of the additional user, when the additional user is selected.

20. A one-to-one question and answer relay system using a network, comprising:
   a user identifier component providing a user identifier search and selection function to a terminal of a first user;
   a question bridge page provider providing a question bridge page to the terminal of the first user when at least one user identifier is selected;
   a question data receiver receiving question data from the terminal of the first user;
   a directory selection function provider providing a directory selection function to the terminal of the first user, the directory selection function enabling the first user to select a directory;
   an additional user selection function provider providing an additional user selection function associated with the directory selected by the first user, to the terminal of the first user, the additional user selection function enabling the first user to select a second user associated with the selected directory, based on information of the second user provided to the first user, the provided information comprising at least one of a success rate of the second user's previous answers and an adopted rate of the second user's previous answers;

a question data storage component storing the received question data in an answer request area of the second user; and an answer data storage component storing answer data about the question data in an answer check area of the first user, the answer data being received from a terminal of the second user, wherein the additional user selection function provider arranges users of the selected directory, according to expert points associated with each of the users, and wherein the answer request area comprises at least one of 1) an answer request list corresponding to a list of question data received from a user, 2) a selection field for selecting whether to receive a question and selecting a number of daily receivable questions, and 3) statistical data of numerical values associated with a requested question.

21. The system of claim 20, wherein the question bridge page provider comprises:
   a question bridge page transmitter transmitting the question bridge page to the terminal of the first user;
   a keyword receiver receiving a keyword from the terminal of the first user via a keyword input field associated with the question bridge page; and
   a question registration request field provider searching existing question data using the keyword, and providing a duplicate question data and question registration request field to the terminal of the first user.

22. The system of claim 20, wherein the question data storage component transmits the question data to an additional user, by using an additional user selection function, when the question data is completely stored and an additional request is received from the first user, and further comprises an additional user question data storage component storing the question data in an answer request area of the additional user when the additional user is selected.

23. A computerized method for providing one-to-one question and answer relay, the method comprising:
   providing a user interface configured to allow a first user to search for other users who have answered questions similar to a question of the first user, and to send the first user's question to a second user selected from among the searched users, the user interface comprising:
      a directory selection function to allow the first user to select a user directory;
      an additional user selection function to allow the first user to select a second user from the selected user directory, based on information of the second user provided to the first user, the provided information comprising at least one of a success rate of the second user's previous answers and an adopted rate of the second user's previous answers,
      wherein the searched users are arranged according to expert points associated with each of the users;
   transmitting the question to the second user in response to the first user's request;
   storing the question in a database;
   notifying the second user of the question;
   receiving the second user's answer corresponding to the question;
   storing the second user's answer in the database; and
   notifying the first user of the answer,
   wherein the notifying the second user of the question comprises displaying the first user's question data in an answer request area of the second user, the answer request area comprising at least one of 1) an answer request list corresponding to a list of question data received from a user, 2) a selection field for selecting whether to receive a question and selecting a number of daily receivable questions, and 3) statistical data of numerical values associated with a requested question.

24. The method of claim 23, wherein the notifying the first user of the answer comprises displaying at least a portion of the answer data in an answer check area of the first user.

25. The method of claim 23, wherein the providing the user interface comprises:
- receiving a keyword from the first user via a keyword input field of the interface;
- searching existing question data using the keyword; and
- providing at least one duplicate question data to the terminal of the first user.

26. The method of claim 23, further comprising:
- storing the question data in an answer request area of an additional user when the additional user is selected.

27. The method of claim 23, further comprising relaying an Internet phone connection between the first user and the second user, in response to the first user's request for calling, when the first user and the second user are capable of utilizing the Internet phone.

* * * * *